(12) United States Patent
Haas et al.

(10) Patent No.: US 7,971,362 B2
(45) Date of Patent: Jul. 5, 2011

(54) MOTOR-DRIVEN SABER SAW WITH GUIDE DEVICE

(75) Inventors: Günter Haas, Kaufering (DE);
Bernhard Link, Schwubbruch (DE);
Adrian Steingruber, Schwabmuenchen (DE); Eberhard Lang, Stuttgart (DE)

(73) Assignee: Hilti Aktiengesellschaft, Schaan (LI)

( * ) Notice: Subject to any disclaimer, the term of this patent is extended or adjusted under 35 U.S.C. 154(b) by 273 days.

(21) Appl. No.: 12/082,927

(22) Filed: Apr. 14, 2008

(65) Prior Publication Data

US 2008/0263876 A1 Oct. 30, 2008

(30) Foreign Application Priority Data

Apr. 16, 2007 (DE) .......................... 10 2007 000 231

(51) Int. Cl.
*B23D 49/16* (2006.01)
(52) U.S. Cl. ........................................... 30/377; 30/392
(58) Field of Classification Search .................... 30/370, 30/371, 374, 376, 377, 392, 373
See application file for complete search history.

(56) References Cited

U.S. PATENT DOCUMENTS

| | | | | |
|---|---|---|---|---|
| 5,007,172 A * | 4/1991 | Palm | | 30/377 |
| 5,421,091 A * | 6/1995 | Gerritsen, Jr. | | 30/377 |
| 5,718,050 A * | 2/1998 | Keller et al. | | 30/123.4 |
| 6,249,979 B1 * | 6/2001 | Bednar et al. | | 30/392 |
| 6,272,757 B1 * | 8/2001 | Roe | | 30/377 |
| 6,308,423 B1 | 10/2001 | Ono | | |
| 6,317,988 B1 * | 11/2001 | Tachibana et al. | | 30/376 |
| 6,484,409 B2 * | 11/2002 | Campbell et al. | | 30/371 |
| 6,612,039 B2 * | 9/2003 | Kakiuchi et al. | | 30/392 |
| 6,851,193 B2 * | 2/2005 | Bednar et al. | | 30/377 |
| 7,082,689 B2 * | 8/2006 | Beville et al. | | 30/377 |
| 7,310,880 B2 * | 12/2007 | Hartmann | | 30/377 |
| 7,395,603 B2 * | 7/2008 | Sugiura et al. | | 30/377 |
| 7,430,807 B2 * | 10/2008 | Saegesser et al. | | 30/122 |
| 2004/0187321 A1 * | 9/2004 | Hartmann et al. | | 30/377 |
| 2005/0252011 A1 * | 11/2005 | Neumeier | | 30/371 |
| 2009/0113727 A1 * | 5/2009 | Chen | | 30/376 |

* cited by examiner

*Primary Examiner* — Hwei-Siu C Payer
(74) *Attorney, Agent, or Firm* — Abelman, Frayne & Schwab

(57) ABSTRACT

A motor-driven saber saw includes a guide device releasably connectable with the saw housing (11) in a region of the neck (13) and including a guide element (21) for guiding the saber saw (10) over a workpiece, a connection device (22) for connecting the guide element (21) to the housing (11) and having at least one connection part extending along an axis (A) and connectable with the neck (13), with the guide element (21) being supported on the at least one connection part (24) for displacement along the axis (A), and with the guide device (20) further including at least one spring element (27) located between the at least one connection part (24) and the guide element (21).

4 Claims, 2 Drawing Sheets

MOTOR-DRIVEN SABER SAW WITH GUIDE DEVICE

BACKGROUND OF THE INVENTION

1. Field of the Invention

The present invention relates to a motor-driven saber saw including a housing having a neck extending in a direction of a working tool holder, and a guide device releasably connectable with the housing in a region of the neck and having a guide element for guiding the saber saw over a workpiece, a connection device for connecting the guide element to the housing and having at least one connection part connectable with the neck.

2. Description of the Prior Art

In the saber saws of the type discussed above, the guide element, such as guide shoe or tubular adapter is used to provide for a reliable and precise guidance of a saber saw over a workpiece. During the operation of the saber saw, the guide element is pressed against the workpiece.

U.S. Pat. No. 5,421,091 discloses a saber saw having a housing, a guide shoe for guiding the saber saw over a workpiece, and a motor-driven, in a pendulum-like manner, push rod. The guide show is pivotally supported at an end of a connection rail having an elongate recess. The connection rail is displaced in an essentially square flat housing receptacle and is formlockingly secured therein.

German Publication DE 199 32 637 discloses a saber saw having a housing, a guide shoe for guiding the saber saw over a workpiece. The guide shoe is pivotally supported at an end of a slide shaft slidable in the housing, and is secured to the housing by an adjusting device. To this end, the adjustment device has a bolt over a head of which, a bolt-tightening lever is fitted. By pivoting the bolt-tightening lever, the slide shaft can be fixedly secured to the shaft with the bolt from the slide shaft release condition and be released from the fixed condition.

The drawback of the saber saw discussed above consists in that the vibration, which act on the guide shoe during an operation of the saber saw, are transmitted to the saw neck that functions as a hand-hold.

Accordingly, an object of the present invention is to provide a saber saw with a guide element and in which the above-mentioned drawback is eliminated, and vibrations are reduced.

SUMMARY OF THE INVENTION

This and other objects of the present invention, which will become apparent hereinafter, are achieved by providing a saber saw in which the guide element is supported on the at least one connection part for displacement along an axis, and the guide device further includes at least one spring element located between the at least one connection part and the guide element. The spring element absorbs the rapidly increasing accelerations and damps a further transmission of vibrations and impacts.

Advantageously, the at least one spring element is formed as an elastomeric sleeve. This provides, in addition to separation of vibrations, also for their damping, on one hand, and on the other hand, enables their cost-effective replacement.

Advantageously, the at least one spring element is displaceably supported on the connection part. This permits to eliminate additional means for displacing the spring element.

Advantageously, the connection device has two connection parts, and the guide device has two damping sleeves located between the guide elements and respective connection parts and displaceably supported on the respective connection parts. This permits to achieve a symmetrical damping of vibrations.

Advantageously, the displacement path of the guide element relative to the at least one connection part amounts to from 2 mm to 12 mm, whereby an adequate damping path is available.

According to a constructively advantageous embodiment of the invention, the guide device further includes a support part for the guide element supported on the at least one connection part, and the at least one spring element is located between the connection part and the support part.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiment, when read with reference to the accompanying drawings.

DETAILED DESCRIPTION OF THE PREFERRED EMBODIMENTS

Figure 1:
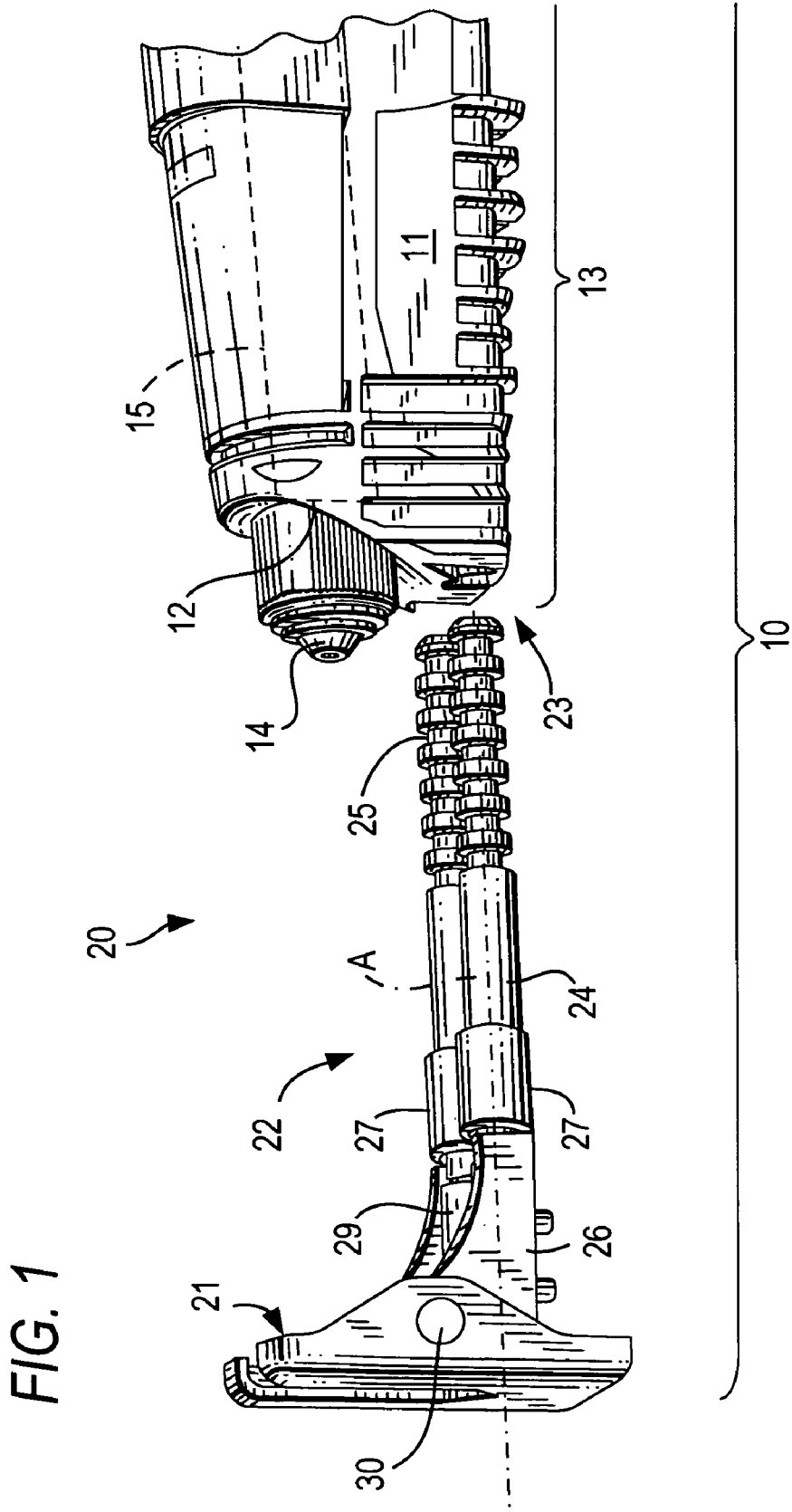
FIG. 1 a side perspective view of a tool neck with a working tool holder of an inventive saber saw with a separated therefrom guide device.
Figure 2:
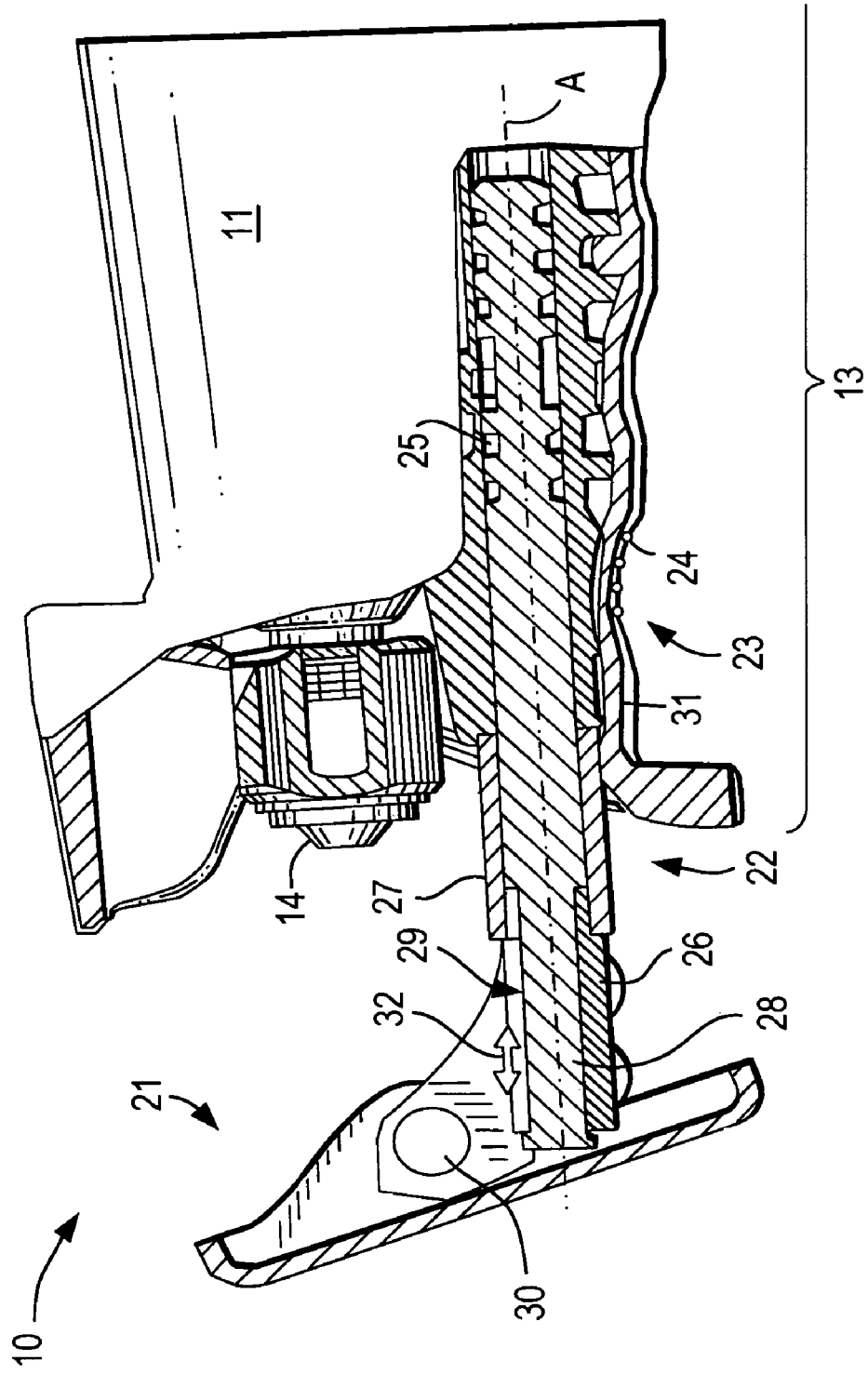
FIG. 2 a partial longitudinal cross-sectional view of the tool neck of the saber saw shown in FIG. 1 with the guide device mounted thereon.

A motor-driven saber saw 10, a front, working tool-side portion of which is shown in FIGS. 1-2, has a housing 11 having, at its working tool end, a working tool opening 12 and a saw neck 13 which is formed next to the opening 12 and which serves during operation as a handhold. Because the saw neck 13 serves as a hand-hold during operation, it is surround, in an end-assembled condition, with a glove 31 (see FIG. 2) which is not shown in FIG. 1 for clarity sake. During operation, a working tool holder 14, which is mounted at a free end of a push rod 15, which is shown with a dash line, together with a secured thereon, saw blade, reciprocates through the opening 12.

Fig. 1 shows a saw blade guide device 20 separated from the housing 11 of the saw 10. The guide device 20 includes a guide element 21 in form of a guide shoe and a connecting device 22 which connects the guide device 20 to the housing 11. The connection device 22 can be inserted in a connection device receiving element 23 in the longitudinal direction of the tool neck 13. The connection device 22 has two rod-shaped connection parts 24 having a circular cross-section. The two rod-shaped parts 24 form, at their respective ends, a plurality of locking elements 25 having the same size and equidistantly spaced from each other. In the mounted condition of the connection parts 24 in the tool neck 13, the locking elements 25 cooperate with counter locking elements provided in the neck, whereby the connection parts 24 are axially fixedly secured in the tool neck 13, as particularly shown in FIG. 2. At their respective ends opposite the connection elements 25, the connection parts 22 have, respectively, an elongate holding part 28 for the guide element 21. The holding parts 28 are received in respective receptacles 29 formed in a support part 26. The guide element 21 is pivotally supported on the support part 26 with a support pin 30. The support part 26 is axially displaceable, within limits, relative to the rod-shaped connection parts 24 along the holding elements 28 (in the direction of arrow 32). The axial displacement path of the support part 26 relative to the connection parts 24 extends along an axis A defined by a connection part 24 and lies, e.g., within range from 2 mm to 12 mm. The support part 26 is supported against the connection parts 24 by two elastic spring elements 27. Thereby, during an operation of the saber saw, the vibration acting on the guide elements 21, are damped with respect to the tool neck 13.

The spring elements 27 are formed, e.g., as sleeve of elastomeric material displaceable over the rod-shaped connection parts 24. The spring element 27 can also be formed, e.g., as springs such as, e.g. helical springs. Instead of two spring elements 27, a single, respectively dimensioned, spring element or more than two spring elements can be provided.

Though the present invention was shown and described with references to the preferred embodiment, such is merely illustrative of the present invention and is not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the appended claims.

What is claimed is:

1. A motor-driven saber saw, comprising a housing (11) having a neck (13) extending in a direction of a working tool holder (14); and a guide device (20) releasably connectable with the housing (11) in a region of the neck (13), the guide device (20) including a guide element (21) for guiding the saber saw (10) over a workpiece, a connection device (22) for connecting the guide element (21) to the housing (11) and having at least one connection part (24) extending along an axis (A) and connectable with the neck (13), the neck (13) having connection means (23) for receiving the at least one connection part (24), the guide element (21) being supported on the at least one connection part (24) for an axial displacement relative thereto along the axis (A), the guide device (20) further including at least one spring element (27) located between the at least one connection part (24) and the guide element (21), wherein the at least one spring element (27) is formed as an elastomeric sleeve.

2. A motor-driven saber saw, comprising a housing (11) having a neck (13) extending in a direction of a working tool holder (14); and a guide device (20) releasably connectable with the housing (11) in a region of the neck (13), the guide device (20) including a guide element (21) for guiding the saber saw (10) over a workpiece, a connection device (22) for connecting the guide element (21) to the housing (11) and having at least one connection part (24) extending along an axis (A) and connectable with the neck (13), the neck (13) having connection means (23) for receiving the at least one connection part (24), the guide element (21) being supported on the at least one connection part (24) for an axial displacement relative thereto along the axis (A), the guide device (20) further including at least one spring element (27) located between the at least one connection part (24) and the guide element (21), wherein the at least one spring element (27) is supported on the at least one connection part (24) for an axial displacement relative thereto along the axis (A).

3. A motor saber saw according to claim 2, wherein the connection device has two connection parts (24), and the guide device (20) has two spring elements (27) located between the guide element (21) and respective connection parts and supported on the respective connection parts (24) for an axial displacement relative thereto along respective axes of the two connection parts.

4. A motor-driven saber saw, comprising a housing (11) having a neck (13) extending in a direction of a working tool holder (14); and a guide device (20) releasably connectable with the housing (11) in a region of the neck (13), the guide device (20) including a guide element (21) for guiding the saber saw (10) over a workpiece, a connection device (22) for connecting the guide element (21) to the housing (11) and having at least one connection part (24) extending along an axis (A) and connectable with the neck (13), the neck (13) having connection means (23) for receiving the at least one connection part (24), the guide element (21), wherein the guide device (20) further comprises a support part (26) for the guide element (21) supported on the at least one connection part (24), and the at least one spring element (27) is located between the connection part (24) and the support part (26).

* * * * *